United States Patent [19]

Perl

[11] 4,067,539

[45] Jan. 10, 1978

[54] GAS VALVE

[75] Inventor: Richard L. Perl, Mansfield, Ohio

[73] Assignee: The Tappan Company, Mansfield, Ohio

[21] Appl. No.: 673,925

[22] Filed: Apr. 5, 1976

Related U.S. Application Data

[63] Continuation-in-part of Ser. No. 653,477, Jan. 29, 1976.

[51] Int. Cl.² ............... F16K 31/02; F03G 7/06
[52] U.S. Cl. .................................. 251/11; 251/75; 236/48 R; 236/DIG. 21; 236/101 E
[58] Field of Search ............ 251/11, 360, 75, 285; 236/48 R, 101 E, DIG. 21

[56] References Cited

U.S. PATENT DOCUMENTS

| | | | |
|---|---|---|---|
| 1,643,255 | 9/1927 | O'Dowd | 236/48 R |
| 2,783,946 | 3/1957 | Lansky et al. | 236/48 R |
| 3,229,956 | 1/1966 | White | 236/48 R |
| 3,330,479 | 7/1967 | Vollprecht | 236/48 R |
| 3,682,382 | 8/1972 | Katchka | 236/48 R |
| 3,955,791 | 5/1976 | Meckstroth | 251/11 |

Primary Examiner—Arnold Rosenthal
Attorney, Agent, or Firm—Donnelly, Maky, Renner & Otto

[57] ABSTRACT

A gas valve has a thermally responsive actuator and an electric heater for heating the actuator normally to produce a displacement output that moves a constrained spring to an over-center position in order to snap open the valve poppet.

Portions of the actuator and the poppet holder are aligned such that the actuator portion will interferingly engage the poppet holder portion to move the poppet to its closed position when the heater receives an excessive electric power input causing an excessive mechanical displacement output of the actuator.

25 Claims, 7 Drawing Figures

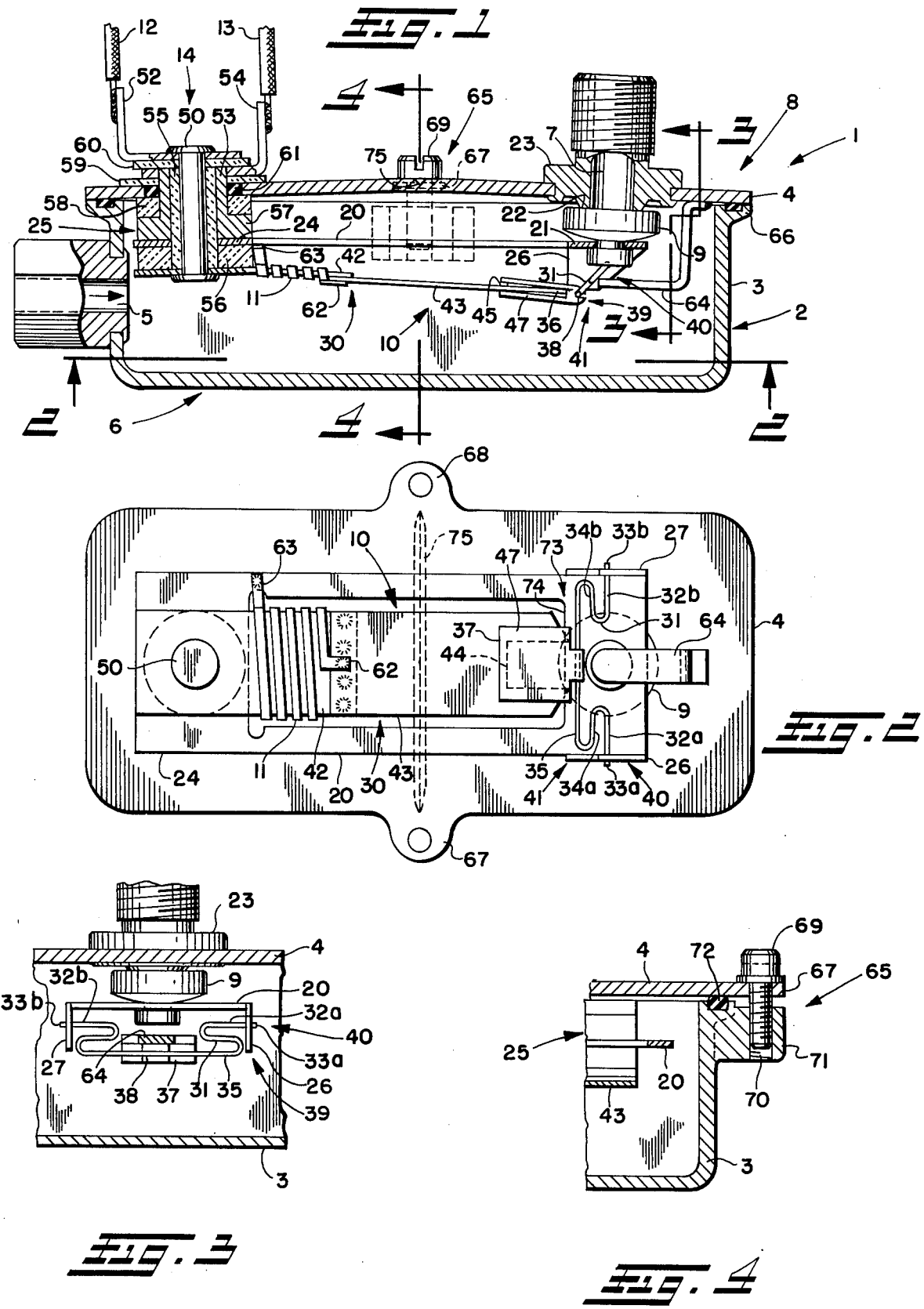

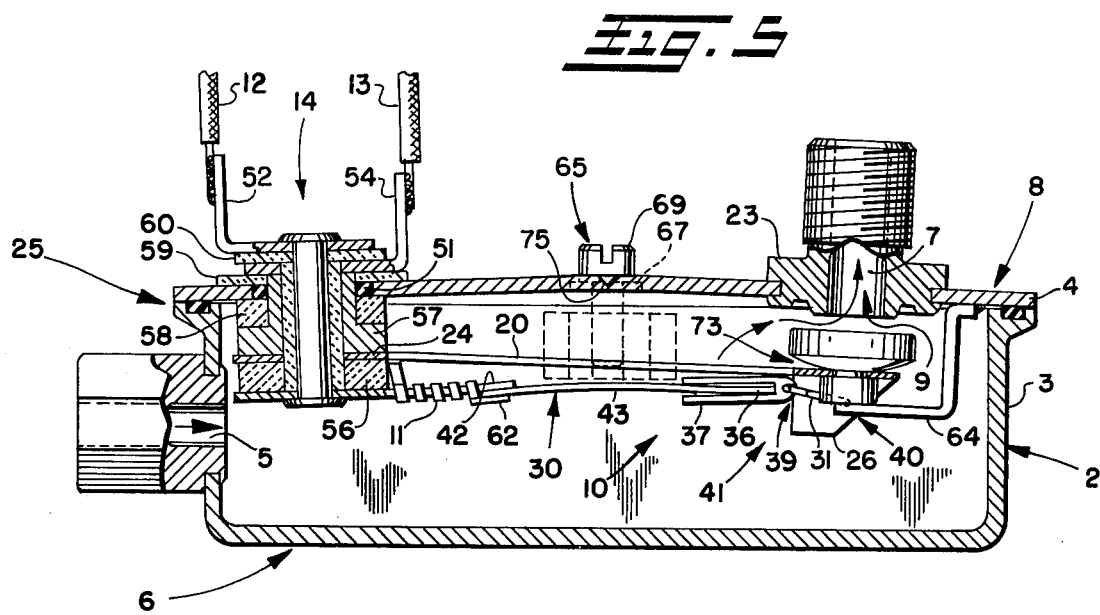
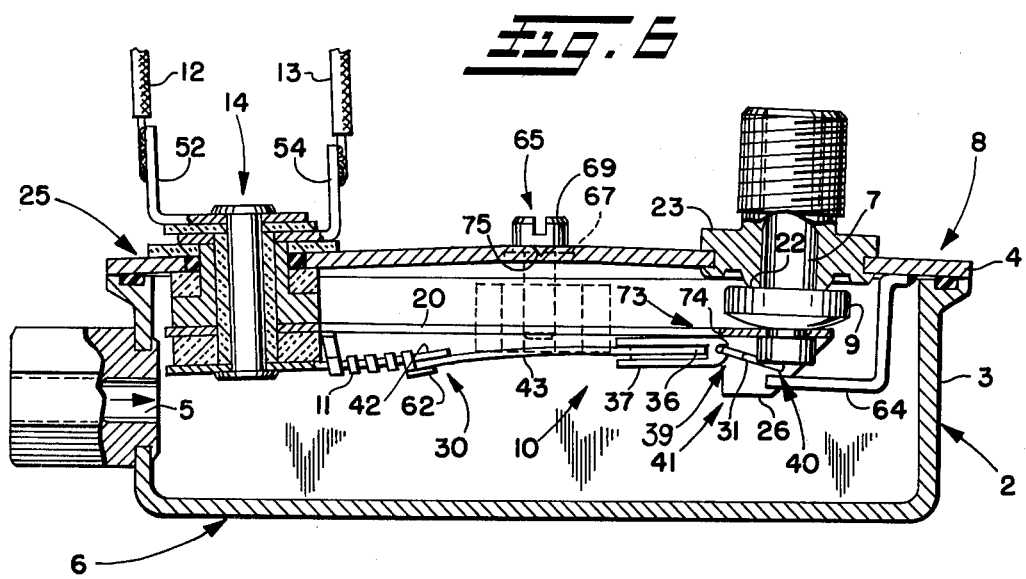
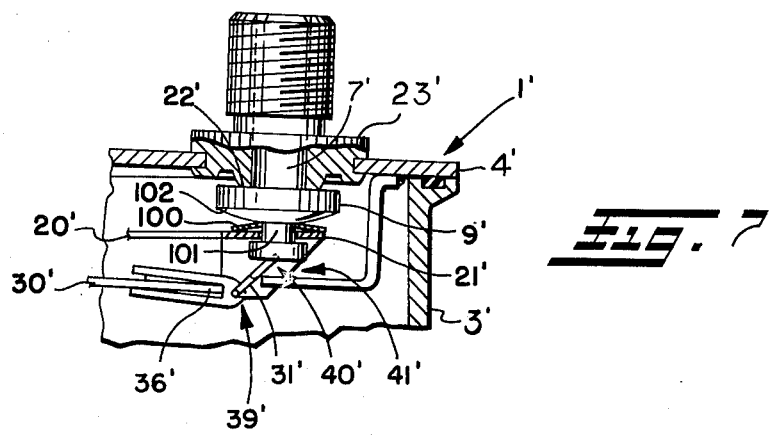

GAS VALVE

CROSS-REFERENCE TO RELATED APPLICATIONS

This application is a continuation-in-part of applicant's copending U.S. patent application Ser. No. 653,477, filed Jan. 29, 1976, entitled "Thermal Valve."

BACKGROUND OF THE INVENTION

The present invention relates generally to fluid valves and, more specifically, to an electro-thermally operative gaseous fuel valve with a mechanism for closing the valve when excessive energizing power is supplied thereto.

One type of thermal fuel valve is disclosed in U.S. Pat. No. 3,870,457. As disclosed in that patent, the thermal fuel valve, for example, may be used with an electric igniter device in a gas range appliance or the like to control gas flow while the igniter provides automatic gas ignition at a burner without the need for a continuously burning, fuel wasting pilot light, thereby saving substantial amounts of fuel when the appliance is not in use. The electric igniter, which is positioned proximate a burner of such an appliance, and an internal electric heater in the thermal fuel valve enclosure, which is positioned to heat a thermally responsive heat warpable member or actuator that moves the poppet to open the valve, are desirably connected for series electric energization. Therefore, the thermal fuel valve will open and allow gas to flow to the burner only when the electric igniter has been energized and preferably the valve is calibrated or adjusted to open only when the igniter is near or at a temperature suitable for igniting the gaseous fuel. Moreover, since the force required to be exerted by the actuator to move the poppet from its seat is usually dependent on the gas pressure in the valve, such calibration normally would take into consideration the normal gas pressure.

Since an appliance incorporating such a valve arrangement as disclosed in that patent does not experience any fuel flow in the fuel circuit between the appliance fuel input connection and the burner unless the valve is open, the pressure regulator in that fuel circuit, which is usually located between the fuel input connection and the thermal fuel valve, may not operate properly to regulate the fuel pressure until the valve opens to allow fuel flow. While satisfactory fuel flow to the pilot light in prior art ranges will maintain the pressure regulator operable, or nearly so, complete closure of fuel flow in ranges or the like in which no pilot lights are used may cause a relatively high pressure at the fuel valve under a no flow condition, which may impede valve opening.

Accordingly, a snap-acting type thermal fuel valve, which is effectively operable over a relatively wide range of gas pressures, for example, on the order of from about four inches to about twenty inches on a water column, to assure valve opening and closing without concern for pressure variation in that range, is disclosed in U.S. patent application Ser. No. 653,477 for "Thermal Valve," filed Jan. 29, 1976, assigned to the same assignee as the present application. The thermal fuel valve disclosed in that Application employs an over-center mechanical energy storage and release mechanism to effect snap opening and snap closing of the valve poppet. When heated, the heat warpable member of such valve compresses a constrained spring while relatively moving its pivot points so as to effect an over-center traveling thereof whereupon some of the energy stored in the spring is relatively rapidly released to snap open the poppet. Calibration of such a snap-acting thermal fuel valve coordinates valve opening, ass determined by the relative spacing of the spring pivot points and the amount of relative movement thereof to pass the center position, with the igniter temperature without substantial concern for the gas pressure in the valve enclosure.

SUMMARY OF THE INVENTION

In the thermal fuel valve of the present invention means are provided to effect closure of the valve when excessive energizing power is supplied to the valve heater or other valve energizing mechanism, which when energized normally causes valve opening. More particularly, means are employed to move the valve element or poppet to close the valve outlet when the valve actuator over-travels or moves beyond its normal range, for example in response to excessive heating, in a direction that usually effects valve opening if such movement were within a predetermined normal range. The excessive heating might occur in response to a short circuiting of the electric igniter, which is series connected with the valve heater, whereby excessive current is supplied the latter; and by effecting valve closure when the short-circuited igniter fails to heat, the invention prevents appreciable leakage of unignited gas at the burner.

In one embodiment of the invention the poppet is held by a supportive carrier; and a valve actuator, which includes a heat warpable member and a movable over-center mechanical energy storage mechanism, moves that carrier to move the poppet toward and away from the valve outlet. Portions of the supportive carrier and actuator are aligned so that they will interfere or abut if the actuator over-travels beyond its normal movement range in the valve-opening direction, and then continued movement of the actuator in that direction correspondingly effects movement of the carrier, which moves the poppet to a closed position. Thus, if any bi-metal set should occur in the heat warpable member due to excessive high temperatures, such set will be in the safe direction maintaining the valve closed.

In a preferred form the invention utilizes a snap-action type operation, for example, similar to that described in the above-mentioned U.S. Patent Application, with the attendant advantages of relative insensitivity to pressure, assured and rapid opening and closure, rapid operation of the pressure regulator, prompt fuel ignition, elimination of flashback, and the like. Moreover, an improved over-center arrangement is employed to maintain the pivots thereof in known locations, and a pivotable holder for the over-center member helps to start the over-center travel to avoid encountering a dead-center unstable condition during valve opening or closing operation. The valve of the invention has a compact construction, may be externally calibrated or adjusted, and may be automatically compensated for ambient temperature variations. Also the thermally responsive heat warpable actuator of the thermal fuel valve may be exposed to the cooling effect of fuel flowing through the valve enclosure so that after the valve has been opened, the slightly cooled actuator becomes primed to cause closure of the valve relatively promptly after the internal valve heater is deenergized.

With the foregoing in mind, it is a principal object of the invention to provide a thermal fuel valve improved in the noted respects.

Another object is to close a fluid valve when the valve element actuator over-travels beyond its predetermined normal displacement range in a direction that normally effects valve opening.

An additional object is to close an electro-thermally responsive fluid valve when an excessive power input condition exists, for example, caused as by a short circuiting, partial short, over voltage, etc., of one or more elements in the electrical circuit supply to the valve heater.

A further object is to effect opening and closing of a fluid valve, and particularly a thermal fuel valve, with promptitude and with relative insensitivity to pressure over a relatively wide range of internal valve pressures and to assure valve closure in the event of over-travel of the valve actuator or over-powering of the valve heater.

Still another object is to avoid a dead-center condition of an over-center device, especially as employed to open and to close the fluid valve.

Still an additional object is to facilitate external calibration of a fluid valve.

Still a further object is to facilitate construction and to reduce the costs of electro-thermal fluid valves.

Yet another object is to provide automatic compensating calibration of a fluid valve in response to ambient temperature conditions.

These and other objects and advantages of the present invention will become more apparent as the following description proceeds.

To the accomplishment of the foregoing and related ends, the invention, then, comprises the features hereinafter fully described and particularly pointed out in the claims, the following description of the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a section view, which is partly in elevation, of a closed thermal fuel valve in accordance with the invention;

FIG. 2 is a partial bottom view of the thermal fuel valve of FIG. 1 looking generally in the direction of the arrows 2—2 thereof;

FIG. 3 is a partial section view, which is partly in elevation, of the thermal fuel valve of FIG. 1 looking generally in the direction of the arrows 3—3 thereof;

FIG. 4 is a partial section view of the calibration mechanism of the thermal fuel valve of FIG. 1 looking generally in the direction of the arrows 4—4 thereof;

FIG. 5 is a section view, which is partly in elevation, of the thermal fuel valve in open condition;

FIG. 6 is a section view, which is partly in elevation, of the thermal fuel valve in its over-powered closed condition; and FIG. 7 is a partial section view, which is partly in elevation, of a modified valve closure arrangement employing ambient temperature compensating means as an alternate embodiment of the invention.

DESCRIPTION OF THE PREFERRED EMBODIMENT

Referring now more particularly to the drawings, wherein like reference numerals designate like parts in the several figures, and initially to FIGS. 1 through 4, a thermal fuel valve in accordance with the invention is generally indicated at 1. The thermal fuel valve 1 includes an enclosure 2, for example of metal, which is formed of a hollow container 3 to which a cover 4 is secured, a gas inlet 5 at one end 6 of the enclosure, gas outlet 7 at a generally opposite end 8 of the enclosure, a valve element or poppet 9, which is movable to open and to close the outlet, and a valve actuator 10 that is operable to effect such movement of the poppet. An electric resistance heater 11, which may be considered part of the valve actuator 10, inside the enclosure 2 may be electrically energized by power provided on a pair of electrical leads 12, 13 from a supply, not shown, via an electrical feed-through arrangement 14, and the heat produced in the course of normal energization of the heater 11 causes the valve actuator 10 to move the poppet 9 from its normally closed condition to open the outlet 7, for example, to allow the flow of gaseous fuel to a burner of a gas range appliance or the like for combustion thereat. Moreover, when heater 11 is deenergized, the valve actuator 10 effects movement of the poppet 9 to close the outlet so as to stop such gas flow.

A supportive carrier 20, which may be of metal, such as stainless steel or the like, has an end plate 21 for holding the poppet 9 in alignment with a valve seat 22 of an outlet fitting 23, which is secured in fluid-tight relation to the cover 4 through an opening therethrough. The supportive carrier 20 has a further end plate portion 24 that is mounted to the cover 4 by a supporting structure 25, which incorporates the electrical feed-through 14 and will be described in more detail below. The supportive carrier 20 is preferably somewhat resilient such that it normally tends to urge the poppet to a position near or in abutment with the valve seat 22, and the supportive carrier has a pair of downwardly depending, generally parallel, spaced apart ears or tabs 26, 27 for connection to the valve actuator 10.

Valve actuator 10 includes a thermally responsive member 30 that assumes a position generally as shown in FIG. 1 when the thermal fuel valve 1 is deenergized and that warps to produce an upward mechanical displacement toward the cover 4 in response to heat generated by the heater 11 to effect opening of the valve, as will be described further below. The valve actuator 10 also includes a resilient member or spring 31 formed of a bent wire having a first pair of spaced apart coaxial arms 32a, 32b with respective tips 33a, 33b that extend through openings in the ears 26, 27 for pivotal or rotatable attachment thereto, a second pair of generally linear coaxial arms 34a, 34b, and a third generally linear arm 35 that is coupled to the end 36 of the member 30 by a spring holder 37. Preferably the several arms, which are coupled by respective bends, are normally located in a common plane. Part of the spring arm 35, which is pivotably captured in a recess 38 in the body of the spring holder 37, and the pivotal coupling of the first pair of spring arms 32a, 32b to the ears 26, 27, may be considered the respective first and second pivot axes 39, 40 of the over-center arrangement 41. One particular advantage of the rotatable connections of the bent wire spring 31 is that the respective pivot axes, which are at least nearly true circular pivots, make the thermal fuel valve 1 more accurately controllable. However, it will be appreciated that other types of resilient members or springs and connections thereof in mechanical energy storing and releasing over-center arrangements may be equivalently employed to obtain effective operation of the thermal fuel valve 1 in accordance with the invention.

The thermally responsive member 30 includes a bi-metallic element arm 42, which is mounted to the cover 4 by the supporting structure 25 so as to warp in an upward direction toward the cover when heated by the heater 11, and an extension arm 43 may be welded or otherwise secured to the bi-metallic element arm to couple the latter via the spring holder 37 to the spring 31. The extension arm 43 may be simply a linear extension of the bi-metallic element arm 42, but is preferably of a bi-metallic or similar construction to act as a compensator in opposition to the bi-metallic element arm 42 so as to provide a measure of compensation for the warping characteristic of the bi-metallic element arm as it is heated to obtain a desired mechanical displacement of the end 36. Thus, as the bi-metallic element arm 42 warps upwardly to open the valve, the compensator 43 will warp downwardly, but to a lesser extent, to minimize creeping of the actuator end 36 after the valve opens as the bi-metal continues to heat up somewhat, and to assist in maintaining the end 36 of the compensator fairly level during valve actuation, substantially as illustrated in FIG. 5.

A cut-out opening 44 in the end 36 of the member 30 receives the inserted spring holder 37, which has a groove 45 in three peripheral side edges thereof so that the holder 37 easily fits in the cut-out opening 44. Upper and lower flange-like faces 46, 47 of the holder 37 overlap the solid extent of the member 30 about the cut-out opening 44. Moreover, the groove 45 preferably is of a greater thickness dimension between the opposed flange-like faces than the thickness of the extension arm 43 so that the spring holder 37 may undergo a slight pivotal movement with respect to the generally linear extent of the extension arm, as will be described further below. Also, the spring holder 37 is preferably electrically non-conductive to electrically isolate the supportive carrier 20 and the thermally responsive member 30.

The supporting structure 25, which incorporates the feed-through 14, includes an electrically conductive rivet 50 that extends from a mechanical and electrical connection with the bi-metallic element arm 42 within the enclosure 2 through an opening 51 in the cover 4 to a mechanical and electrical connection with an electrical terminal 52 outside the enclosure and an electrically conductive cylinder 53 generally coaxial with the rivet and in electrical connection with the end plate 24 of the supportive carrier 20 inside the enclosure and with an electrical terminal 54 outside the enclosure. An electrically non-conductive cylindrical spacer 55 separates the rivet 50 and the cylinder 53. The rivet 50 draws the electrically conductive bi-metallic element arm 42, an electrically non-conductive spacer disc 56, the electrically conductive further end plate 24, a flange portion 57 of the cylinder 53, and a further electrically non-conductive spacer disc 58 toward supportive engagement with the inner face of the cover 4 and the two terminals 52, 54 and electrically non-conductive spacers 59, 60 toward supportive engagement with the outer face of the cover 4. One or more electrically non-conductive seals, such as the seal 61 about the opening 51, assure the fluid-tight integrity of the enclosure 2 at the supporting structure 25. The cylinder 53 and the discs 56, 58 may be formed of ceramic material, such as Steatite, and the spacers 59, 60 may be formed of mica or other similarly electrically non-conductive material.

When the thermal fuel valve 1 is deenergized, the thermally responsive member 30 assumes the position illustrated in FIG. 1, for example, so that the pivot axis 40 is between the valve seat 22 and the first pivot axis 39. Therefore, the mechanical energy stored in the spring 31 will push the supportive carrier 20 toward the valve seat so that the poppet 9 seals closed against the valve seat to close the valve outlet 7. This closure is assured due to the fact that the strength or resistance to bend of the thermally responsive member 30 is preferably greater than that of the supportive carrier 20. Moreover, the poppet 9 is preferably of a shape such that gas pressure in the closed valve further urges the poppet toward the seat 22.

To open the thermal fuel valve 1, the heater 11 is energized, via a circuit including the leads 12, 13, terminals 52, 54, rivet and cylinder 50, 53 and bi-metallic element arm 42 and supportive carrier 20, respectively, to which the heater ends 62, 63 are attached, to produce heat. The heated thermally responsive member 30 warps toward the cover 4 working against only an opposing force exerted by the spring 31, thus, initially compressing the same to store potential energy or to increase its potential energy. As the warping thermally responsive member 30 moves the first pivot axis 39 of the spring 31 to a center position, the spring holder 37, which has appreciably less mass and, thus, inertia than the poppet 9 and its supportive carrier 20, pivots on the member 30 from a relation thereto as shown in FIG. 1 to a relation thereto as shown in FIG. 5. The described pivotal action of the spring holder 37 together with continued upward warping of the member 30 clearly moves the first pivot axis 39 to an over-center position with respect to the pivot axis 40, whereupon at least some of the energy stored in the spring 31 is released to force the end plate 21 of the supportive carrier 20 in a downward direction away from the cover 4 toward a stop 64 to snap the poppet 9 a fixed distance away from the valve seat 22, as is illustrated in FIG. 5, to open the valve outlet 7.

To close the thermal fuel valve 1, the heater 11 is deenergized, and the thermally responsive member 30 warps away from the cover 4 initially compressing the spring 31 to increase its potential energy. As the center position of the axes 39, 40 is reached, the spring holder 37 pivots back to its FIG. 1 relation with the member 30, and this action together with the continued downward warping of the member 30 assures over-center travel again of the axes 39, 40, whereupon the spring snaps the supportive carrier 20 and the poppet 9 toward the valve seat 22 to close the valve outlet 7.

After the poppet 9 has been withdrawn from the valve seat 22 to open the valve outlet 7, continued energization of the heater 11 with electric power at a normal level will provide sufficient heat to maintain the member 30 in its warped condition, as shown in FIG. 5, so that the valve remains open. Moreover, since the gas inlet 5 and the gas outlet 7 are located at generally opposite ends 6, 8 of the enclosure 2, gas flowing through the open valve will tend to cool the thermally responsive member 30, which then warps slightly away from cover 4, albeit not sufficiently far to close the valve, priming itself to effect prompt valve closure after the heater 11 is deenergized.

It is, of course, desirable to coordinate the point in time at which the valve opens with the temperature of the igniter, which is series connected with the heater 11, so that the valve will not open until the igniter has at least approximately reached a temperature sufficient to ignite the gas at the burner of a gas range appliance, for example. One calibrating arrangement for externally adjusting the thermal fuel valve 1 with respect to such an igniter is illustrated in the drawings at 65 to change the normal relative locations of the two pivotal axes 39, 40, when the valve is closed and, therefore, to change the required displacement of the thermally responsive member end 36 to effect over-center travel of the spring 31 to open the valve. More particularly, the calibrating arrangement 65 provides for controlled slight convex bowing of the cover 4, for example, on the order of from about 1° to about 5°, with respect to the plane of the peripheral flanges 66 of the hollow container 3 at ends 6, 8. A pair of ears 67, 68 (see FIGS. 2 and 4) at opposite sides of the cover may be moved toward or away from the plane of the flange 66 by screws 69, which are located in threaded openings 70 of the container flanged ears 71, for pivoting the supporting structure 25 in clockwise or counterclockwise direction to move the pivotal axis 39 away or toward, respectively, the second pivot axis 40. A seal 72 between the cover 4 and container flange 66 preferably is sufficiently large and resilient to allow for such change in the bowing of the cover 4 by the calibrating arrangement 65 without loss of the fluid-tight integrity of the thermal fuel valve 1. Also, although the high point of the cover bow is illustrated in the drawings generally at a central portion along its length between the opposite ends 6, 8 of the valve, such high point and the tightening mechanism therefor may be located nearer the supporting structure 25 so as to increase the angular displacement of the support structure 25 and thus the travel of the thermally responsive member end 36 and the first pivot axis 39 in response to tightening or loosening of the calibrating screws 69, so as to minimize the amount of bowing (and thus movement) of the cover required to obtain the desired calibration. The cover 4 is desirably provided with a coined slot or groove 75 in the region of the screws 69 to provide a weakened portion to facilitate such bowing of the cover.

An over-ride mechanism 73 for closing the valve 1 when excessive power is supplied the heater 11 includes the end 36 of the thermally responsive member 30 and the rearward edge 74 of the end plate 21 of the supportive carrier 20, which are aligned with each other for interfering engagement, separated only by the spring holder 37, when the heater produces excessive heat so as to cause over-travel warping toward the cover 4 of the thermally responsive member beyond its normal displacement range. Accordingly, in the event the heater 11 is energized to receive more power than it would normally receive, for example, due to a short circuiting of the igniter in series circuit therewith, the thermally responsive member 30 will warp upwardly initially to effect opening of the valve in the manner illustrated in FIG. 5. However, the excessive heat output from the heater causes the thermally responsive member 30 to continue to warp toward the cover until the end 36 pushes the supportive carrier 20 and, therefore, the poppet 9 to close the valve as shown in FIG. 6 until such excessive energization condition is terminated. The compensator 43 movement in the opposite direction will be much less, so as not to preclude closing of the valve under such conditions of excessive heat output from the heater as previously described. The spring 31, which is the active member that normally effects movement of the poppet 9, is not overly stressed during such excessive power condition or excessive over-travel of the thermally responsive member 30. If too much power is applied, a circuit protecting fuse should provide adequate protection for the circuit. Moreover, if any bi-metal set should occur in the thermally responsive member due to excessive high temperatures, such set will be in the safe direction maintaining the valve closed.

Turning now briefly to FIG. 7, wherein primed reference numerals are used to designate the elements corresponding to those designated by unprimed reference numerals in FIGS. 1 through 6, there is illustrated part of a thermal fuel valve 1' that may include a thermally responsive compensator member 100 to provide for ambient temperature compensation of the valve operation, as may be desirable or necessary. The member 100 is preferably in the shape of a washer that circumscribes the stem 101 of the poppet 9' to bear against the lower surface 102 of the enlarged poppet head and against the end plate 21' of the supportive carrier 20'. The igniter in a gas range appliance will heat to a gas ignition temperature more quickly in a relatively warm ambient environment than in a relatively cold ambient environment; therefore, it is the purpose of the member 100 to vary the movement required to open the valve 1' with respect to ambient temperature with which the valve has equalized. More particularly, when the member 100 is cold its bending increases to urge the supportive carrier 20' and, thus, the second pivot axis 40' downward away from the valve seat 22' to reduce the movement required of the thermally responsive member end 36' and the first pivot axis 39' to snap the poppet open. Such downward travel movement of the second pivot axis 40' causes the spring 31' to move closer to an over-center condition, and, therefore, the upward movement of the end 36' of the thermally responsive member 30' necessary to move the first pivot axis 39' beyond the center condition is reduced. Therefore, the thermal fuel valve 1' will open when substantially the same amount of power is supplied to the thermally responsive member 30', irrespective of whether the valve is cold or hot, for in the latter case the member 100 would flatten such that the pivot axes 39', 40' would separate to increase the required displacement of the end 36' to effect over-center travel of the over-center mechanism 41' of the valve.

Preferably, the active and compensating portions 42 and 43, respectively, of the thermally responsive member 30 will be properly matched to eliminate the need for the bi-metal compensator washer 100. However, such compensator washer 100 may be used to compensate for minimal ambient temperature effect in the system, also to take care of production variances in the actuator, and so on. Of course, different types of bi-metals may be used for the compensator washers to make them more or less heat responsive, and more than one washer may also be used to act both as a spacer, and also to obtain a different heat compensating action as well.

In view of the foregoing, it should be clear that the thermal fuel valve of the invention provides for snap opening and closing of the valve element so that the valve operates promptly and is relatively insensitive to a wide range of pressures in the valve enclosure and also includes means for assuring closure of the valve in the event of an over-energization condition thereof. Moreover, external calibration and ambient temperature compensation features are provided with the other advantages and features described above.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed and defined as follows:

1. A fluid valve, comprising a fluid-tight enclosure having an inlet and an outlet; a valve element supported for movement to respective positions to open and to close said outlet; actuator means for moving said valve element from one of said positions to the other of said positions, said actuator means including a thermally responsive means for producing a mechanical displacement output, and over-center mechanical energy storage means for moving said valve element from one to the other of said positions in response to such mechanical displacement output within a predetermined normal range; and means for closing said outlet in response to such mechanical displacement output of said actuator means in a direction normally to effect opening of said outlet exceeding such predetermined normal range.

2. A fluid valve as set forth in claim 1, further comprising deflectable, supportive carrier means for supporting said valve element, and said means for closing comprising respective portions of said actuator means and said supportive carrier means, said respective portions being in interfering alignment with each other, whereby upon producing such excessive mechanical displacement output said actuator means interferingly engages said supportive carrier means to move the latter and said valve element to close said outlet.

3. A fluid valve as set forth in claim 1, said actuator means further comprising electric heater means for heating said thermally responsive means, and said thermally responsive means comprising a bi-metal element, such excessive mechanical displacement occuring in response to a supply of excessive electric power to said electric heater means.

4. A fluid valve as set forth in claim 1, wherein said energy storage means is loaded by such mechanical displacement output to store potential energy and releases at least some of such potential energy as kinetic energy upon movement past an over-center condition, thereby to move said valve element.

5. A fluid valve as set forth in claim 1, further comprising supportive carrier means for supporting said valve element, said energy storage means comprising a resilient member supported between said thermally responsive means and said supportive carrier means.

6. A fluid valve as set forth in claim 5, said thermally responsive means including an arm movable relative to said supportive carrier means in response to a change in temperature of said thermally responsive means, said resilient member having a first and second support points movable respectively with said arm and with said supportive carrier means and thus having two different stable positions depending on the relative locations of said supportive points, and said resilient member tending in each of said stable positions to urge said support points and thus said arm and said supportive carrier means away from each other, whereby in one of said stable positions said resilient member urges said supportive carrier means and thus said valve element to a position to close said outlet and in the other one of said stable positions said resilient member urges said supportive carrier means and thus said valve element to a position to open said outlet.

7. A fluid valve as set forth in claim 6, further comprising holder means for coupling said resilient member to one of said arm and said supportive carrier means, said holder means being pivotably mounted on the respective one of said arm and said supportive carrier means to which it couples said resilient member to induce over-center travel of one of said first and second support points with respect to the other as said arm moves said first support point to a center position with respect to said second support point.

8. A fluid valve as set forth in claim 7, said resilient member comprising a wire spring including first and second arm means for support thereof, said supportive carrier means comprising first means for holding said first arm means for relative constrained pivotal movement and said holder means comprising second means for holding said second arm means for relative constrained pivotal movement.

9. A fluid valve as set forth in claim 7, said arm having a cut-out at one end thereof, and said holder means having a peripheral groove to fit in said cut-out for pivotal support of said holder means by said arm.

10. A fluid valve as set forth in claim 9, said means for closing comprising respective portions of said actuator means, including said holder means, and said supportive carrier means in interfering alignment with each other, whereby in response to such excessive mechanical displacement output said holder means interferingly engages said supportive carrier means to move the latter and said valve element to close said outlet.

11. A fluid valve as set forth in claim 1, wherein said inlet and outlet are located generally at opposite ends of said enclosure, and said thermally responsive means is positioned in the fluid flow path between said inlet and said outlet for exposure to the cooling effect of fluid flowing through said enclosure.

12. A fluid valve as set forth in claim 1, further comprising calibrating adjustment means for adjusting the valve to set the required magnitude of such mechanical displacement output to effect movement of said energy storage means to an over-center condition.

13. A fluid valve as set forth in claim 12, wherein said enclosure comprises a container and a cover mounted thereto, said cover being bowed convexly with respect to said container, said valve further comprising means for supporting said actuator means from said cover, and said calibrating adjustment means comprising means for deforming said cover.

14. A fluid valve as set forth in claim 1, further comprising means for compensating valve operation with respect to ambient temperature.

15. A fluid valve, comprising a fluid-tightenclosure having an inlet and an outlet; a valve element supported for movement to respective positions to open and to close said outlet; actuator means for moving said valve element from one of said positions to the other of said positions, said actuator means including thermally responsive means for producing a mechanical displacement output, and over-center mechanical energy storage means for moving said valve element from one to the other of said positions in response to such mechanical displacement output within a predetermined normal range; electric heater means for heating said thermally responsive means to effect such mechanical displacement output to open said outlet in response to an electric power input to said electric heater means within a normal operating power range; and means for effecting closure of said outlet during application of a greater electric power input to said electric heater means in excess of such normal operating power range.

16. A fluid valve as set forth in claim 15, further comprising supportive carrier means for supporting said valve element, and said means for closing comprising respective portions of said actuator means and said supportive carrier means in interfering alignment with each other, whereby in response to excessive heat from said over powered electric heater means said actuator means interferingly engages said supportive carrier means to move the latter and said valve element to close said outlet.

17. A fluid valve as set forth in claim 15, wherein said means for effecting closure of said outlet is responsive to a mechanical displacement output of said thermally responsive means greater than required to open said outlet to close said outlet.

18. A fluid valve, comprising a fluid-tight enclosure having an inlet and an outlet; a valve element supported for movement to respective positions to open and to close said outlet; actuator means for moving said valve element from one of said positions to the other of said positions; said actuator means including a thermally responsive means for producing a mechanical displacement output, and over-center mechanical energy storage means for moving said valve element from one to the other of said positions in response to such mechanical displacement output of said thermally responsive means; means for compensating valve operation with respect to ambient temperature; and supportive carrier means for supporting said valve element, said energy storage means comprising a resilient member having respective support points mounted between said thermally responsive means and said supportive carrier means, and said means for compensating comprising temperature sensitive means for varying the normal spacing of said support points when said outlet is closed by said valve element.

19. A fluid valve as set forth in claim 18, further comprising means mounting said valve element for limited movement relative to said supportive carrier means, said means for compensating being interposed between said valve element and said supportive carrier means for varying the spacing between said supportive carrier means and said outlet to vary the normal spacing of said support points when said outlet is closed by said valve element in response to variations in ambient temperature.

20. A fluid valve as set forth in claim 19, wherein said means for compensating comprises a thermally responsive washer, said valve element having a poppet and a stem projecting therefrom, said washer circumscribing said stem and bearing against said poppet and said supportive carrier means.

21. A fluid valve, comprising a fluid-tight enclosure having an inlet and an outlet; a valve element supported for movement to respective positions to open and to close said outlet; actuator means for moving said valve element from one of said positions to the other of said positions, said actuator means including a thermally responsive means for producing a mechanical displacement output, and over-center mechanical energy storage means for moving said valve element from one to the other of said positions in response to such mechanical displacement output within a predetermined normal range; supportive carrier means for supporting said valve element, said energy storage means comprising a resilient member supported between said thermally responsive means and said supportive carrier means, said thermally responsive means including an arm movable relative to said supportive carrier means in response to a change in temperature of said thermally responsive means, said resilient member having first and second support points movable respectively with said arm and with said supportive carrier means and thus having two different stable positions depending on the relative locations of said support points, and said resilient member tending in each of said stable positions to urge said support points and thus said arm and said supportive carrier means away from each other, whereby in one of said stable positions said resilient member urges said supportive carrier means and thus said valve element to a position to close said outlet and in the other one of said stable positions said resilient member urges said supportive carrier means and thus said valve element to a position to open said outlet; and holder means for coupling said resilient member to one of said arm and said supportive carrier means, said resilient member comprising a wire spring including first and second arm means for support thereof, said supportive carrier means comprising first means for holding said first arm means for relative constrained pivotal movement and said holder means comprising second means for holding said second arm means for relative constrained pivotal movement.

22. A fluid valve as set forth in claim 21, wherein said holder means is pivotably mounted on the respective one of said arm and said support carrier means to which it couples said resilient member to induce over-center travel of one of said first and second support points with respect to the other as said arm moves said first support point to a center position with respect to said second support point.

23. A fluid valve as set forth in claim 22, wherein said arm has a cut-out at one end thereof, and said holder means has a peripheral groove to fit in said cut-out for pivotable support of said holder means by said arm.

24. A fluid valve, comprising a fluid-tight enclosure having an inlet and an outlet; a valve element supported for movement to respective positions to open and to close said outlet; actuator means for moving said valve element from one of said positions to the other of said positions, said actuator means including a thermally responsive means for producing a mechanical displacement output, and over-center mechanical energy storage means for moving said valve element from one to the other of said positions in response to such mechanical displacement output within a predetermined normal range; supportive carrier means for supporting said valve element, said energy storage means comprising a resilient member supported between said thermally responsive means and said supportive carrier means, said thermally responsive means including an arm movable relative to said supportive carrier means in response to a change in temperature of said thermally responsive means, said resilient member having first and second support points movable respectively with said arm and with said supportive carrier means and thus having two different stable positions depending on the relative locations of said support points, and said resilient member tending in each of said stable positions to urge said support points and thus said arm and said supportive carrier means away from each other, whereby in one of said stable positions said resilient member urges said supportive carrier means and thus said valve element to a position to close said outlet and in the other one of said stable positions said resilient member urges said supportive carrier means and thus said valve element to a position to open said outlet; and holder means for coupling said resilient member to one of said arm and said supportive carrier means, said holder means being pivotably mounted on the respective one of said arm and said supportive carrier means to which it couples said resilient member to induce over-center travel of one of said first and second support points with respect to the other as said arm moves said first support point to a center position with respect to said second support point.

25. A fluid valve as set forth in claim 24, wherein said arm has a cut-out at one end thereof, and said holder means has a peripheral groove to fit in said cut-out for pivotable support of said holder means by said arm.

* * * * *